US010079700B1

(12) United States Patent
Sahin et al.

(10) Patent No.: US 10,079,700 B1
(45) Date of Patent: *Sep. 18, 2018

(54) EDGE WINDOWING OF OFDM BASED SYSTEMS

(71) Applicant: University of South Florida Research Foundation, Tampa, FL (US)

(72) Inventors: Alphan Sahin, Tampa, FL (US); Huseyin Arslan, Tampa, FL (US)

(73) Assignee: UNIVERSITY OF SOUTH FLORIDA RESEARCH FOUNDATION, Tampa, FL (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/097,464

(22) Filed: Apr. 13, 2016

Related U.S. Application Data

(63) Continuation of application No. 13/680,306, filed on Nov. 19, 2012, now Pat. No. 9,319,253.
(Continued)

(51) Int. Cl.
H04L 25/03 (2006.01)
H04L 5/00 (2006.01)
H04J 11/00 (2006.01)

(52) U.S. Cl.
CPC ...... *H04L 25/0384* (2013.01); *H04J 11/0023* (2013.01); *H04L 5/0007* (2013.01)

(58) Field of Classification Search
CPC ........... H04L 25/0384; H04L 25/03828; H04L 5/0007; H04L 27/00; H04L 27/2634;
(Continued)

(56) References Cited

U.S. PATENT DOCUMENTS 7,859,988 B2   12/2010   Yang et al.
7,953,167 B2   5/2011    Ode et al.
(Continued)

OTHER PUBLICATIONS

S. Pagadarai, et al., "A Novel Sidelobe Suppression Technique for OFDM-Based Cognitive Radio Transmission", New Frontiers in Dynamic Spectrum Access Networks, 2008. DySpan 2008. 3rd IEEE symposium on. Oct. 14-17, 2008, pp. 1-7.
I. Cosovic; S. Brandes; M. Schnell, "Subcarrier Weighting: A Method for Sidelobe Suppression in OFDM Systems", IEEE Communications Letters, 2006, pp. 444-446, vol. 10, issue 6.
H.A. Mahmoud & H. Arslan. "Sidelobe Suppression in OFDM-Based Spectrum Sharing Systems Using Adaptive Symbol Transition", IEEE Communications Letters, 2008, pp. 133-135, vol. 12, issue 2.
(Continued)

*Primary Examiner* — Kwang B Yao
*Assistant Examiner* — Ricardo Castaneyra
(74) *Attorney, Agent, or Firm* — Thomas | Horstemeyer, LLP

(57) ABSTRACT

Various methods and systems are provided for edge windowing of orthogonal frequency division multiplexing (OFDM) systems. In one example, among others, a method includes obtaining an edge windowing portion by reducing a cyclic prefix size for a quantity of edge subcarriers in an OFDM symbol and reducing side lobes by applying a windowing function to the edge subcarriers. In another example, a device includes a separator capable of dividing subcarriers of an OFDM symbol into first and second subcarrier groups, a first CP adder capable of obtaining a windowing portion by adjusting a cyclic prefix size of the first subcarrier group, and a first windower capable of reducing side lobes by applying a windowing function to the first subcarrier group. In another example, a method includes determining a RMS delay spread of a mobile station and scheduling a subcarrier based at least in part upon the RMS delay spread.

14 Claims, 15 Drawing Sheets

Related U.S. Application Data

(60) Provisional application No. 61/561,015, filed on Nov. 17, 2011.

(58) Field of Classification Search
CPC ............. H04L 27/2647; H04L 5/0048; H04L 27/2613; H04L 27/2607; H04J 11/0023
See application file for complete search history.

(56) References Cited

U.S. PATENT DOCUMENTS

| | | |
|---|---|---|
| 8,005,479 B2 | 8/2011 | Melyappan |
| 8,009,747 B2 | 8/2011 | Song |
| 8,422,577 B1 | 4/2013 | Shetty et al. |
| 2002/0105901 A1 | 8/2002 | Chini et al. |
| 2004/0097238 A1 | 5/2004 | Hwang et al. |
| 2006/0133261 A1 | 6/2006 | Cosovic et al. |
| 2006/0217082 A1 | 9/2006 | Fischer |
| 2007/0082692 A1 | 4/2007 | Tirkkonen et al. |
| 2007/0092025 A1 | 4/2007 | Bi |
| 2007/0147226 A1* | 6/2007 | Khandekar ......... H04L 5/0044 370/208 |
| 2007/0280166 A1 | 12/2007 | Jung et al. |
| 2008/0232320 A1 | 9/2008 | Lee et al. |
| 2009/0067524 A1 | 3/2009 | Li |
| 2009/0180559 A1 | 7/2009 | Hsu et al. |
| 2010/0002796 A1 | 1/2010 | Zhang et al. |
| 2010/0034311 A1 | 2/2010 | Hasegawa |
| 2010/0054115 A1 | 3/2010 | Roh |
| 2010/0172316 A1 | 7/2010 | Hwang et al. |
| 2010/0202301 A1 | 8/2010 | Wen et al. |
| 2010/0238876 A1 | 9/2010 | Yamamoto et al. |
| 2013/0005282 A1 | 1/2013 | Zhang et al. |

OTHER PUBLICATIONS

Sahin et al., "Edge Windowing for OFDM Based Systems", Communications Letters, IEEE, vol. 15, Issue: 11, (online publication Sep. 2011).

Larry J. Greenstein et al., A New Path-Gain/Delay-Spread Propagation Model for Digital Cellular Channels; IEEE Transactions on Vehicular Technology, vol. 46, No. 2, May 1997.

Timo Weiss et al., Mutual Interference in OFDM-based Spectrum Pooling Systems, IEEE Dec. 2004.

Hisham A. Mahmoud et al., Sidelobe Suppression in OFDM-Based Spectrum Sharing Systems Using Adaptive Symbol Transition, IEEE Communications Letters, vol. 12, No. 2, Feb. 2008.

Joseph Mitola III et al., Cognitive Radio: Making Software Radios More Personal, IEEE Personal Communications, Aug. 1999.

Jeffrey D. Poston et al., Discontiguous OFDM Considerations for Dynamic Spectrum Access in Idle TV Channels, IEEE, Dec. 2005.

Hisham A. Mahmoud et al., Spectrum Shaping of OFDM-based Cognitive Radio Signals, IEEE, Dec. 2008.

Werner Henkel et al., The Cyclic Prefix of OFDM/DMT—An Analysis, IEEE, Dec. 2002.

Sinja Brandes et al., Reduction of Out-of-Band Radiation in OFDM Systems by Insertion of Cancellation Carriers, IEEE Communications Letters, vol. 10, No. 6, Jun. 2006.

Dr Anil Shukla et al., A Study for the Provision of Aggregation of Frequency to Provide Wider Bandwidth Services, QinetiQ Propiertary, Aug. 2006.

Response from related co-pending U.S. Appl. No. 13/680,306, dated Jul. 8, 2014.

\* cited by examiner

Random scheduling.

Ranging based scheduling.

$T_{rms}$ based scheduling.

EDGE WINDOWING OF OFDM BASED SYSTEMS

CROSS-REFERENCE TO RELATED APPLICATION

This application is a continuation of U.S. patent application Ser. No. 13/680,306, entitled "EDGE WINDOWING OF OFDM BASED SYSTEMS," filed Nov. 19, 2012 which claims priority to U.S. provisional application entitled, "Edge Windowing of OFDM Based Systems," having Ser. No. 61/561,015, filed Nov. 17, 2011, both of which are hereby incorporated by reference in their entirety.

BACKGROUND

Orthogonal frequency division multiplexing (OFDM) is a signaling scheme that may be used for cognitive radios and spectrum aggregation techniques. However, rectangular windowing of OFDM symbols produces high side lobes, which results in adjacent channel interference (ACI). It would be desirable to reduce the ACI while maintaining a high level of spectrum efficiency for OFDM based systems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of methods related to edge windowing of orthogonal frequency division multiplexing (OFDM) based systems. Adaptive windowing of the orthogonal frequency division multiplexing (OFDM) signals may be used to shape the spectrum of the transmitted signal, thereby limiting interference of adjacent bands.

Figure 1:
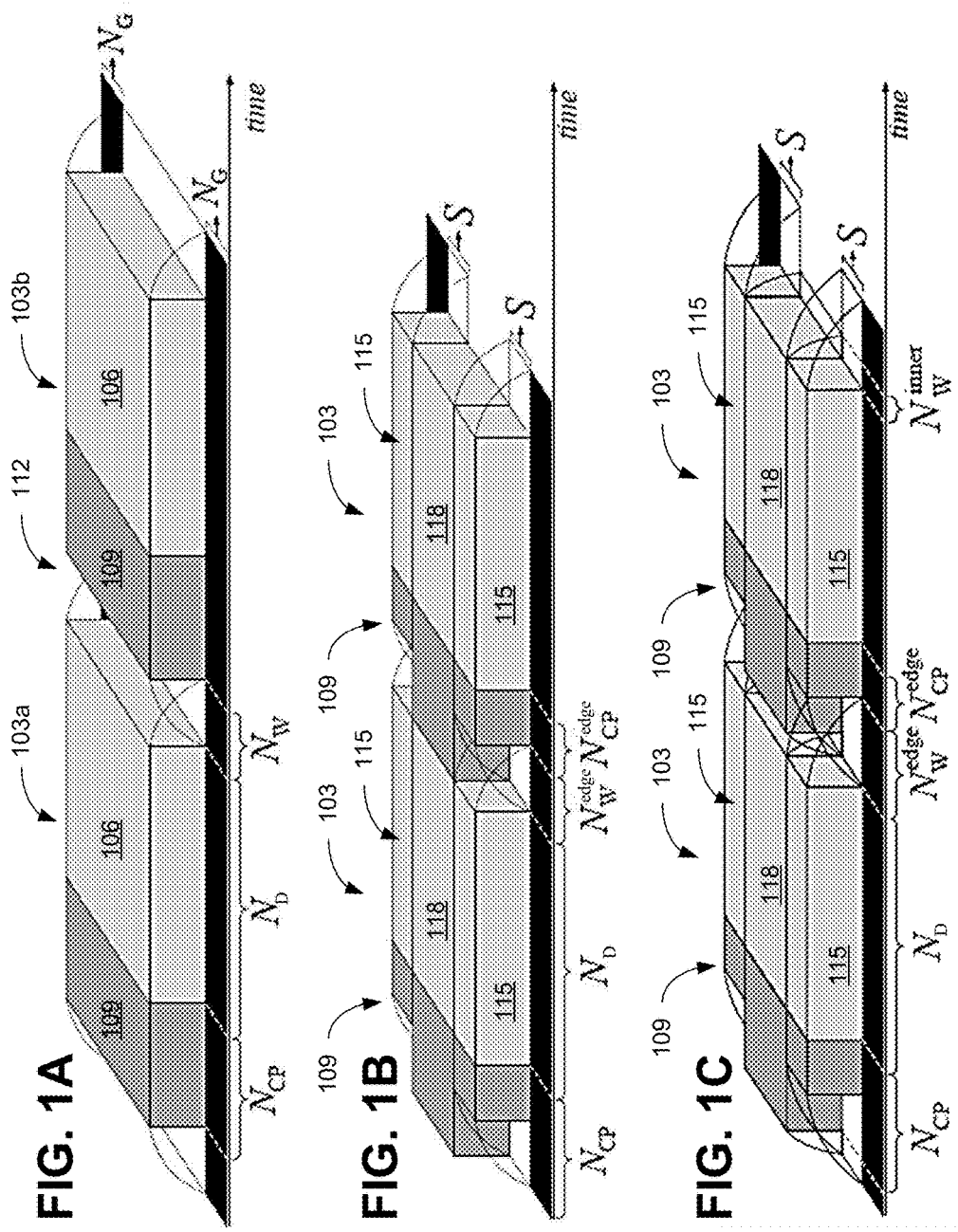
FIG. 1A is a graphical representation illustrating conventional windowing of OFDM symbols.
FIGS. 1B and 1C are graphical representations illustrating edge windowing of OFDM symbols in accordance with various embodiments of the present disclosure.

In conventional windowing, the same windowing is applied to all subcarriers of an OFDM symbol. As illustrated in FIG. 1A, the OFDM symbol includes a data portion 106 (over period $N_D$) and a cyclic prefix 109 (over period $N_{CP}$) to eliminate intersymbol interference (ISI) and intercarrier interference (ICI). In addition, an extra windowing time (or sample period) $N_W$ 112 is added between the two consecutive ODFM symbols 103. The transition between two consecutive ODFM symbols 103 during $N_W$ 112 is smoothed by windowing in order to suppress the side lobes. While the subcarriers of the previous OFDM symbol 103a fade out over $N_W$ 112, the subcarriers of the next OFDM symbol 103b fade in over $N_W$ 112. Since the cyclic prefix 109 and data part 106 of the OFDM symbol remain, there is no ISI problem. However, the added windowing time 112 of the OFDM signals 103 reduces throughput performance of the system.

Consider an OFDM symbol 103 with N available subcarriers, $N_{CP}$ cyclic prefix size, $T_S$ symbol duration, and $N_G$ guard carriers. The smooth transition can be provided with point-to-point multiplication of the windowing function and the OFDM symbol extended with a postfix (e.g., adding $N_W$ samples from the beginning of the OFDM symbol 103 to the end of the OFDM symbol 103) and/or a prefix (e.g., adding $N_{CP}+N_W$ samples from the last of the OFDM symbol 103 to the beginning of the OFDM symbol 103). As can be seen from FIG. 1A, only $N_W$ samples from the last part of the previous OFDM symbol 103a and $N_W$ samples from the beginning part of the next OFDM symbol 103b are overlapped to maintain the orthogonality. Since the duration of the windowed OFDM symbol 103 is $N_D+N_{CP}+N_W$, conventional windowing decreases the spectrum efficiency of the OFDM symbol 103 depending on $N_W$ 112. On the other hand, since the cyclic prefix 109 and data part 106 of the OFDM symbol 103 remain, there is no ISI problem due to the multipath delay spread.

Throughput of the system can be improved by reducing or eliminating the extra windowing time $N_W$ 112 between OFDM symbols 103. The subcarriers located in the middle of the band (or inner subcarriers) have less impact on the side lobes compared to the subcarriers along the edges (or edge subcarriers), since the subcarriers spread as sinc function in frequency domain. Thus, the smooth transition between consecutive OFDM symbols 103 can be achieved by considering mostly the edge subcarriers for windowing operation. Because edge subcarriers of the OFDM symbol 103 have a larger effect on the side lobes of the OFDM symbol than inner subcarriers, the edge subcarriers may be windowed without comparable windowing of the inner subcarriers. Accordingly, windowing can be heavily applied to the edge subcarriers over $N_W$ and the windowing size of the inner subcarriers may be decreased to $N^{inner}_W<N_W$ or eliminated.

With reference to FIG. 1B, windowing of the edge subcarriers 115 may be carried out with a smoother transition to reduce the side lobes without windowing the inner subcarriers 118. The length (or size) of the cyclic prefix 109 of the edge subcarriers 115 is reduced from $N_{CP}$ to $N^{edge}_{CP}$ to obtain a windowing portion $N^{edge}_W$ within the cyclic prefix 109 of the inner subcarriers 118. The size of the cyclic extensions of the inner subcarriers 118 remain as $N_{CP}$. As illustrated in FIG. 1B, windowing is then carried out on the edge subcarriers 115 with smoothing taking place during the windowing portion $N^{edge}_W$. In this way, $N_W$ 112 may be reduced or eliminated, which achieves both improved spectrum efficiency and the side lobe suppression at the same time.

With reference to FIG. 10, different windowing functions may be applied to the edge subcarriers 115 and inner subcarriers 118. The length (or size) of the cyclic prefix 109 of the inner subcarriers 118 is reduced from $N_{CP}$ to $N^{inner}_{CP}$ to obtain a windowing portion $N^{inner}_W$ within the cyclic prefix 109. The size of the cyclic extensions of the edge subcarriers 115 are reduced to $N^{edge}_{CP} < N_{CP}$. Subsequently, the remaining parts from the cyclic extensions are utilized for the windowing of edge subcarriers as $N^{edge}_W = N_{CP} + N^{inner}_W - N^{edge}_{CP}$. As such, windowing of the edge subcarriers 115 may be carried out with a smoother transition to reduce the side lobes, while windowing with a sharper transition may be carried out on the inner subcarriers 118. By windowing the edge subcarriers 115 over a portion of the cyclic prefix 109, the extra windowing time $N_W$ 112 can be reduced to $N_D + N_{CP} N^{inner}_W$ as shown in FIG. 1B, which increases throughput of the system.

Edge windowing provides the advantage of maintaining the spectrum efficiency of OFDM while achieving side lobe suppression. Additionally, edge windowing reduces the windowing time over conventional windowing and may also remove the need for guard bands. A better spectrum shaping can be provided by increasing S. However, if S increases, the number of inner subcarriers 118 which have larger cyclic extension sizes decreases. This may also introduce ISI and ICI on the subcarrier depending on the channel dispersiveness. Also, increasing $N^{edge}_W$ for a given time period of two consecutive OFDM symbols 103 can result in better side lobe suppression. However, it can cause more ICI and ISI, since it reduces the cyclic extension sizes of the edge subcarriers 115.

The ICI is caused by the first $N^{edge}_W$ samples of the edge subcarriers 115. This portion constitutes the combination of two consecutive OFDM symbols 103 as in FIG. 1B. Since the time distance between main parts of the two sequential OFDM symbols 103 is still more than $N_{CP}$ and the edge subcarriers 115 of previous OFDM symbol 103 fade out in the windowing period, the power of the observed ICI on the inner subcarriers 115 will be mitigated by the characteristics of windowing function being used. Since edge windowing is applies the windowing function to OFDM based systems, different windowing functions may be used with edge windowing. Numerous windowing functions that may be used to suppress the side lobes include, e.g., raised-cosine, trapezoidal, cosine, Tukey windowing functions, etc. Edge windowing may be applied not only to OFDM based systems (e.g., OFDM and OFDMA) but also to other OFDM-like systems such as, e.g., single carrier frequency division multiple accessing.

As illustrated in FIG. 1B it is possible to make $N^{inner}_W = 0$. In that case, no windowing is utilized for inner subcarriers 118 by relying on only the side lobe suppression of the edge subcarriers 115. This approach may maximize the spectral efficiency of the OFDM. If the maximum excess delay spread is equal or less than $N^{edge}_{CP}$, neither ISI nor ICI is observed on both edge subcarriers 115 and inner subcarriers 118. In contrast, if the maximum excess delay spread is larger than $N^{edge}_{CP}$, both ISI and ICI can be observed in the edge subcarriers 115. In addition, since the orthogonality is lost between the edge subcarriers 115 and inner subcarriers 118, only ICI is observed at inner subcarriers 118. The impact of the ICI caused by the edge subcarriers 115 becomes weaker for the inner subcarriers 118.

Figure 2:
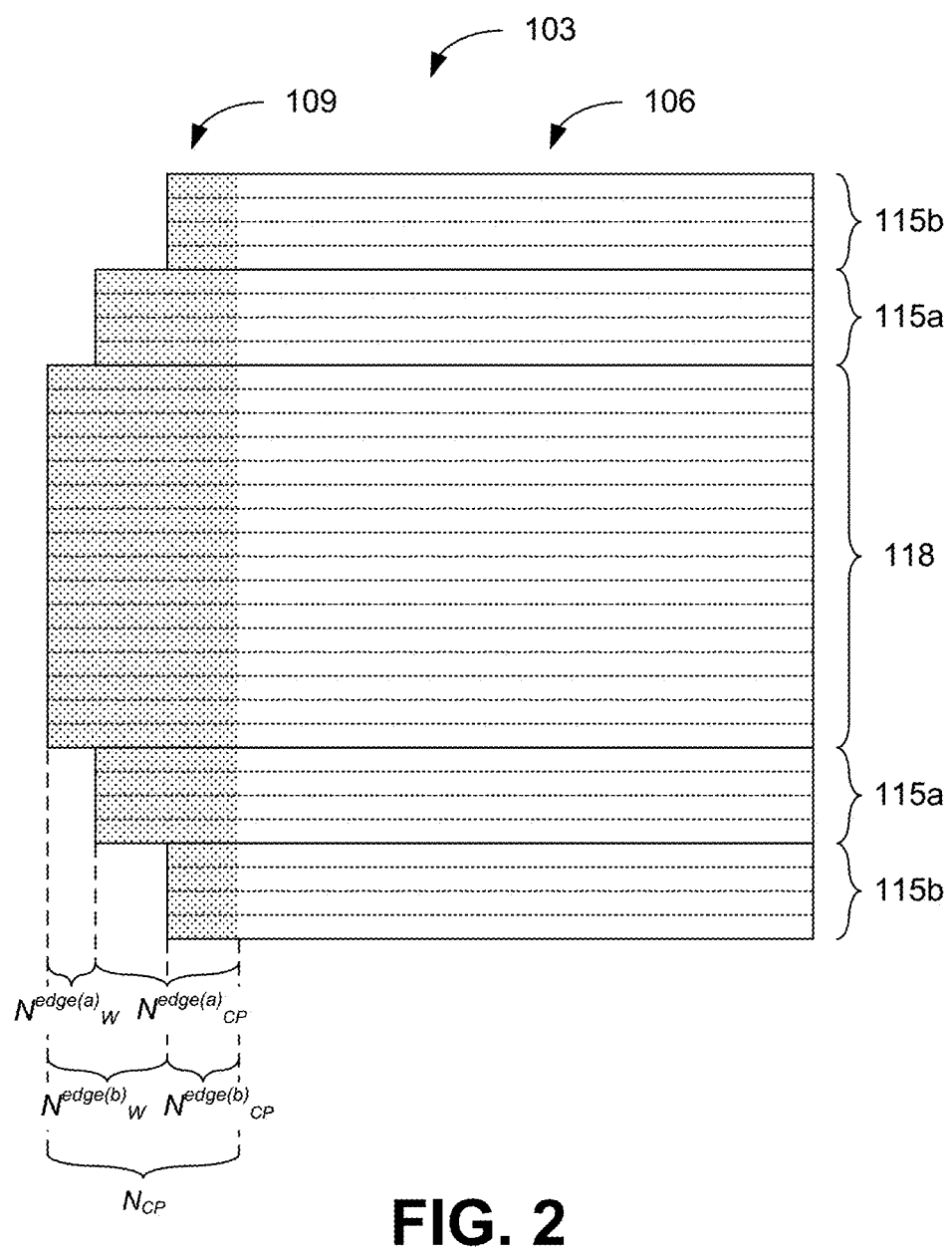
FIG. 2 is a graphical representation of an OFDM symbol including subgroups of edge subcarriers in accordance with various embodiments of the present disclosure.

The edge subcarriers 115 and inner subcarriers 118 may be grouped (or divided up) in a variety of ways. For example, the subcarriers of the OFDM symbol 103 may be equally divided between inner subcarriers 118 and edge subcarriers 115 (e.g., 256 subcarriers with 128 edge carriers and 128 inner carriers) on the right and left sides of the inner subcarriers 118. Other groupings of the subcarriers are equally applicable as can be understood. The edge subcarriers 115 include an equal number of subcarriers (S) on either side of the inner subcarriers 118 (e.g., 64 subcarriers on either side). In addition, the edge subcarriers 115 may be divided into subgroups on either side of the inner subcarriers 118. For example, as illustrated in FIG. 2, an OFDM symbol 103 may be divided between a plurality of inner subcarriers 118, a first subgroup of a first plurality of edge subcarriers 115*a* on the right and left sides of the inner subcarriers 118, and a second subgroup of a second plurality of edge subcarriers 115*b* on the right and left sides of the first plurality of edge subcarriers 115*a*. The length of the cyclic prefix 109 of each subgroup may be reduced by a smaller amount as the subgroups approach the inner subcarriers 118. Different windowing functions may then be applied to the different subgroups. For example, windows with smoother transitions may be applied to edge subcarriers 115 in subgroups that are further from the inner subcarriers 118 with the transitions occurring over the windowing portion of each subgroup of edge subcarriers 115.

In some implementations, a special windowing function may be applied to produce asymmetrical spreading in the frequency domain. The asymmetry provided by this special windowing function may be configured to produce larger right side-lobes and weak left side-lobes with different scales or vice versa. For OFDM systems, the special windowing function may be applied to the edge subcarriers 115 on the left side of the band to produce weak left side lobes and large right side lobes (or right-dominant asymmetry). The right-dominant asymmetry of the special windowing function is gradually decreased towards the edge subcarriers 115 located at the middle of the band. The windowing function is symmetrical only for the edge subcarriers 115 at the center of the band. For the edge subcarriers 115 on the right side of the band, the applied windowing function becomes left-dominant to produce weak right side lobes and large left side lobes. Thus, by applying this special windowing function to the subcarriers in different scales of symmetrically, the energy of the side lobes of the subcarriers are kept in the band. Subsequently, the amplitude of the out-of-band side lobes is reduced.

Figure 3:
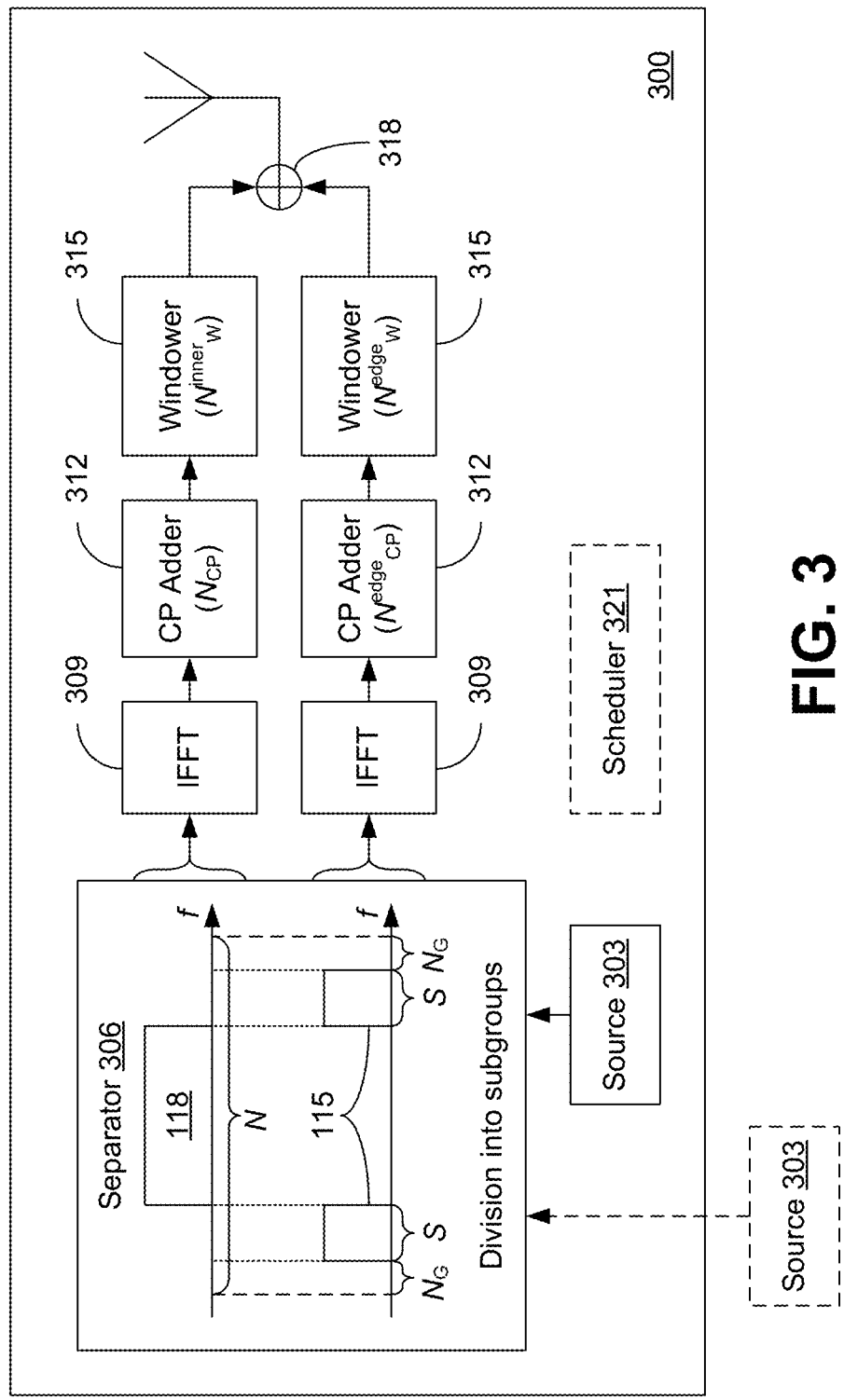
FIG. 3 is a graphical representation of an example of a device 300 capable of handling OFDM signaling in accordance with various embodiments of the present disclosure.

Referring to FIG. 3, shown is a graphical representation of an example of a device 300 capable of handling OFDM signaling. OFDM has developed into a popular scheme for wideband digital communication, whether wireless or over copper wires, used in applications such as, e.g., digital television and audio broadcasting, DSL broadband internet access, wireless networks, and 4G mobile communications. For example, the device 300 may be a cellular telephone or wireless base station capable of processing OFDM signaling. The device 300 receives or obtains a series of OFDM symbols 103 from a source 303 such as, e.g., processing circuitry that generates the series of OFDM symbols 103 or a data store. The source 303 may be internal to the device 300 or external to the device as illustrated in FIG. 3. In some implementations, the OFDM symbols 103 may be from a combination of internal and/or external sources 303. For example, OFDM symbols from two sources 303 may be multiplexed for transmission by the device 300.

The OFDM symbols 103 are initially divided into groups (e.g., subgroups or subblocks) of inner subcarriers 118 and edge subcarriers 115 by a separator 306. For simplicity, the separation can be carried out in the frequency domain. In the example of FIG. 3, the OFDM symbols 103 are separated into a first group including a quantity of inner subcarriers 118 and a second group including a quantity of edge subcarriers 115 based upon the predefined S. In other implementations, the OFDM symbols 103 may be divided into a plurality of edge subcarrier groups as illustrated in FIG. 2. The groups will be processed in parallel and recombined for transmission by the transmitter or transceiver of the device 300.

Each group is then processed by initially performing an inverse fast Fourier transformation (IFFT) 309. A cyclic prefix (CP) adder 312 then adjusts the cyclic prefix to the groups of the OFDM symbols 103. For example, $N^{edge}_{CP}$ may be added to the group of edge subcarriers 115 and $N_{CP}$ may be added to the group of inner subcarriers 118. In other embodiments, the CP adder 312 may reduce the cyclic prefix of the corresponding group to the specified value of $N^{edge}_{CP}$ and/or $N_{CP}$. In some embodiments, the CP adder 312 may adjust a cyclic postfix of the OFDM symbols 103. A windower 315 then windows the OFDM symbol 103 using the specified window function. Combiner (or adder) 318 sums the outputs of the windowers 315 to reform the OFDM symbol 103 for transmission by the transmitter or transceiver of the device 300.

Since the inverse fast Fourier transformation (IFFT) and windowing are linear operations, edge windowing method can be implemented by employing two branches for edge and inner subcarriers. As shown in FIG. 3, parallel branches are used for the IFFT and windowing of the inner subcarriers 118 and the IFFT and windowing for edge subcarriers 115. Edge windowing includes point-to-point operations such as point-to-point multiplication of windowing function and IFFT results and point-to-point summation of the results of the two branches. Thus, the edge windowing does not increase the computation complexity of the IFFT operation 309 which is $O(N \log_2 N)$.

The device 300 includes processing circuitry capable of implementing the separator 306, IFFT 309, CP adder 312, windower 315, and combiner 318 as described above. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions.

The performance of the edge windowing approach was investigated through computer simulations. The simulations were carried out using a raised-cosine windowing function, since the raised cosine windowing function can be widely utilized in OFDM based systems. For OFDM signal parameters, the following were used: N=1024, $N_{CP}$=64, $T_S$=66.7 μs, $N_G$=100, $N_W$=32, $N^{inner}_W$=4. An ITU Vehicular A model was utilized and a Rayleigh distribution was used in each channel realization and normalized with a total power of the generated channel to 1. The simulations were performed over 5000 OFDM symbols and 20000 different channel realizations.

Figure 4:
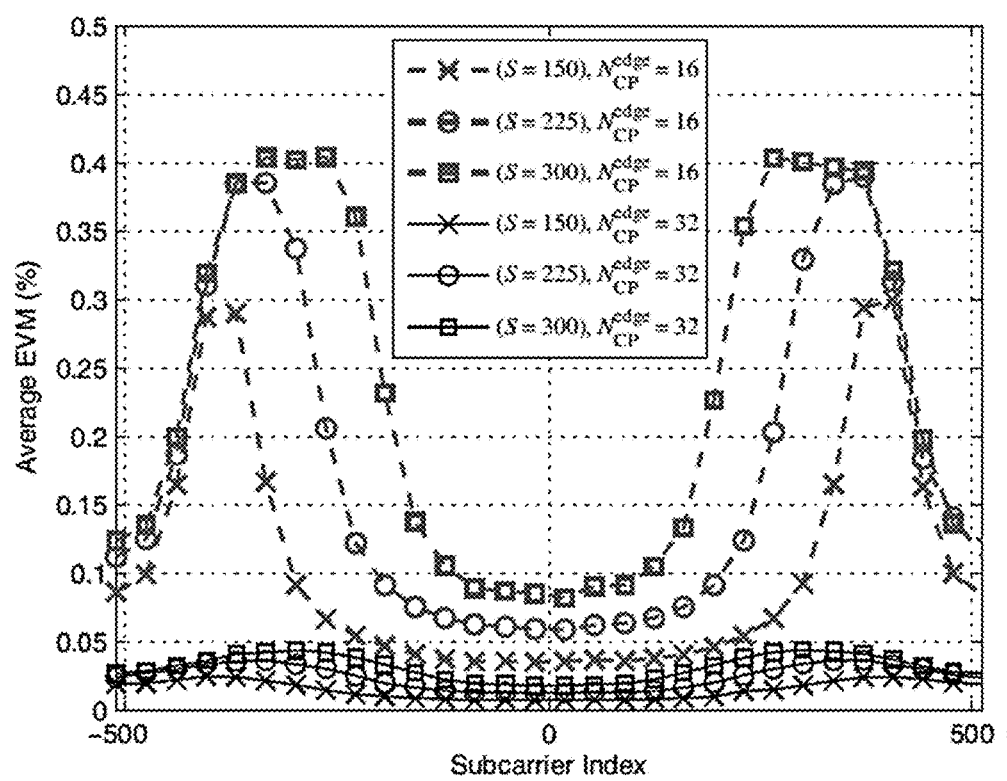
FIG. 4 is an example of the average error vector magnitude (EVM) on subcarriers in accordance with various embodiments of the present disclosure.

Referring to FIG. 4, shown an example of the average error vector magnitude (EVM) on subcarriers for different S and $N^{edge}_{CP}$ values. The impact of the edge windowing on the average EVM performance of each subcarrier for different S and $N^{edge}_{CP}$ values is plotted. The power of the interference can be adjusted by changing the introduced edge windowing parameters. The last tap of the ITU Vehicular A model was at 2510 ns (or nearly 39 samples). Thus, if $N^{edge}_{CP}$ is selected as larger or equal than 39, the ISI/ICI will be avoided totally for any S value. If $N^{edge}_{CP}$ decreases less than 39, ISI/ICI on edge subcarriers 115 and only ICI on inner subcarriers 118 are observed. The impact of the ICI becomes weaker on inner subcarriers 118 as can be seen in FIG. 4. Thus, EVM becomes more severe on edge subcarriers 115. In addition, increasing S results in more EVM for the cases of $N^{edge}_{CP}$<39, since more edge subcarriers 115 lose the orthogonality between inner subcarriers 118.

Figure 5A:
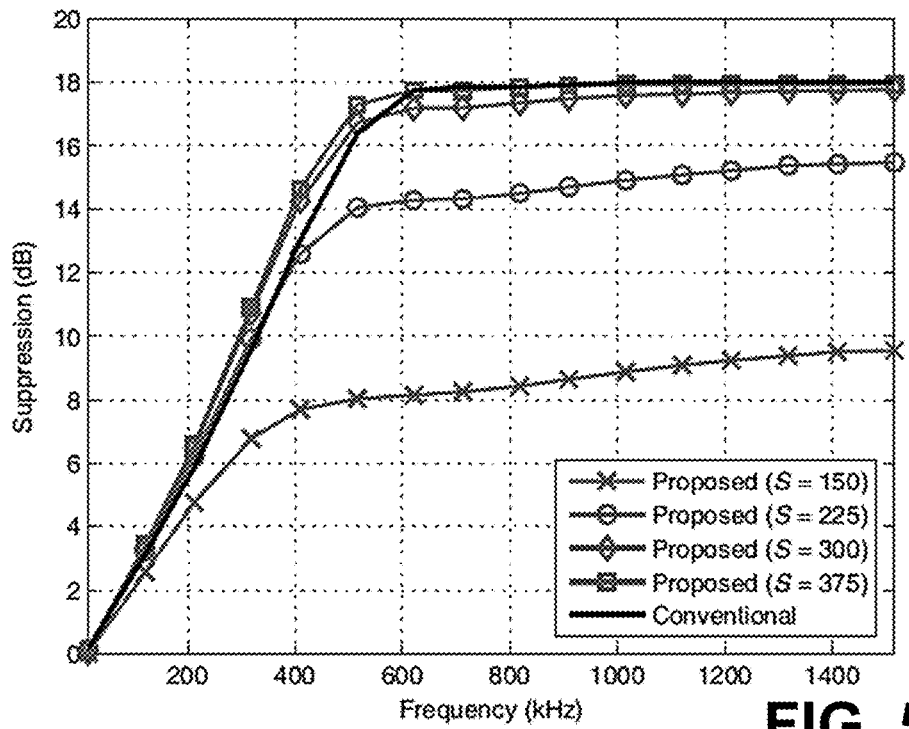
FIGS. 5A and 5B are examples of the suppression performance of edge windowing relative to the non-windowed OFDM in accordance with various embodiments of the present disclosure.
Figure 5B:
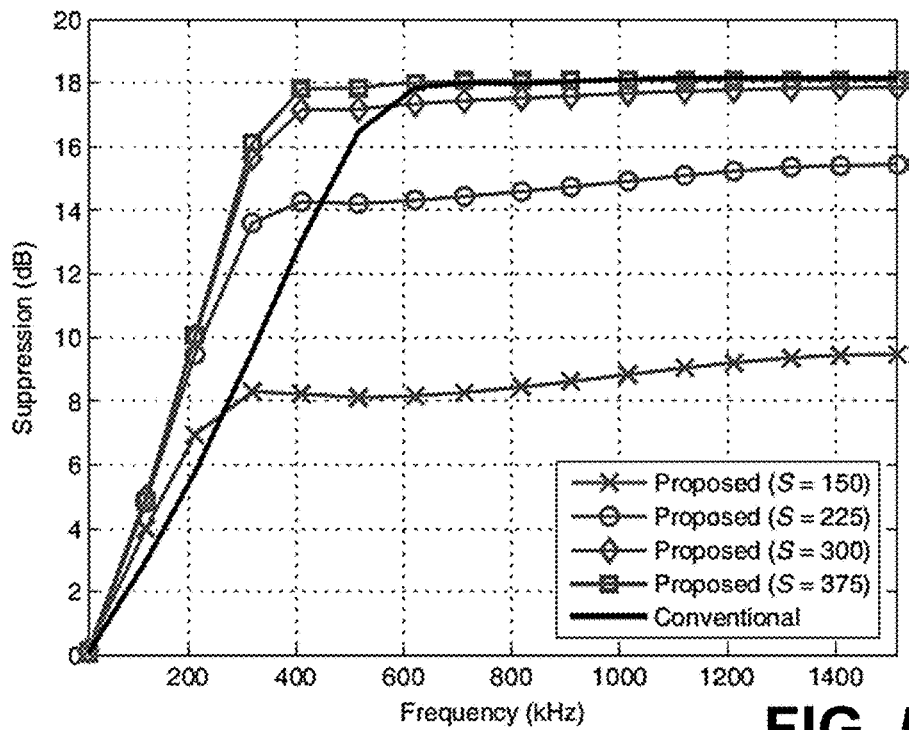

Referring next to FIG. 5, shown are examples of the suppression performance of edge windowing relative to the non-windowed OFDM. The suppression performance of the proposed edge windowing and the conventional windowing relative to the non-windowed OFDM is compared at various frequencies away from the most edge subcarrier 115 (or the subcarrier on the outer edge. The following parameters: $N^{edge}_{CP}$=32 ($N^{edge}_W$=36) are considered in FIG. 5A and $N^{edge}_{CP}$=16 ($N^{edge}_W$=52) are considered in FIG. 5B. If S increases, the suppression performance of edge windowing increases as shown in both FIGS. 5A and 5B. The proposed edge windowing approaches the suppression performance of conventional windowing for every frequency after S=300. On the other hand, by increasing $N^{edge}_W$, edge windowing provides sharper spectral shaping compared to the conventional as in FIG. 5B. The throughput with edge windowing increases by 2.57% compared to the throughput with conventional windowing with these parameters.

The impact of the edge windowing parameters on spectral efficiency, side lobe suppression and average EVM are summarized in TABLE 1 for a given $N_{CP}$. While increasing S provides more side lobe suppression, it causes more average EVM on subcarriers. If $N^{edge}_W$ increases, more suppression is achieved but more EVM is observed due to the less $N^{edge}_{CP}$. On the other hand, employing larger $N^{inner}_W$ provides more side lobe suppression and less EVM while decreasing the spectral efficiency.

TABLE 1

| Item | Spectral Efficiency | Supression | Ave. EVM | $N^{edge}_{CP}$ |
|---|---|---|---|---|
| ↑ S | — | ↑ | ↑ | — |
| ↑$N^{edge}_W$ | — | ↑ | ↑ | ↓ |
| ↑$N^{inner}_W$ | ↓ | ↑ | ↓ | — |

As may be seen from the results of FIGS. 4 and 5, the proposed edge windowing technique provides both spectral efficiency and side lobe suppression. Edge windowing introduces a new degree of freedom in spectral efficient side lobe suppression and controllable ISI/ICI. By changing the introduced parameter of edge windowing; suppression performance and spectral efficiency may be changed adaptively by introducing a controllable interference. This degree of freedom may be exploited with a subcarrier based adaptive approach like adaptive modulation, power control, and scheduling to improve the capacity and performance of OFDM based wireless communication systems.

The impact of ISI and/or ICI due to the insufficient cyclic prefix 109 of the edge subcarriers 115 may be reduced or eliminated by proper scheduling of the subcarriers and exploiting the dependency of channel dispersive characteristics to the distance between a transmitter and a receiver of, e.g., cellular communications. User devices (e.g., mobile stations) that are closer to the base station have less dispersive channels, thus allowing for use a shorter cyclic prefix 109 without adversely affecting ISI. User devices (e.g., mobile stations) located near a base station have less dispersive channels than users located further away. Because of this, nearby users require less of a cyclic prefix 109 than those users located at greater distances. By assigning the inner subcarriers 118 to users that are further away from the base station, ICI and ISI can be mitigated. For example, channels of user devices that fall within (or are less than) a distance threshold may be assigned to edge subcarriers and channels of user devices that fall outside (or are greater than) the distance threshold may be assigned to inner subcarriers. The distance threshold may be determined based at least in part upon the number of edge carriers (S) and the determined distances of the user devices. The determined distance should be located to separate the all channels between the edge and inner subcarriers. In other implementations, the subcarriers may be scheduled based upon the root mean square (RMS) delay spread ($T_{RMS}$ or $T_{rms}$) of the channel.

Consider the downlink of an OFDMA based system with a coverage radius of R. A circular shape is considered rather than a hexagonal shape in order to simplify the analysis. The base station is located at center of the cell and the locations of mobile stations are distributed uniformly. The transmitted OFDMA symbol 103 from the base station is given with the parameters of N available subcarriers, $N_{CP}$ cyclic prefix size, $T_S$ OFDMA symbol duration, and $N_G$ guard subcarriers.

Figure 6:
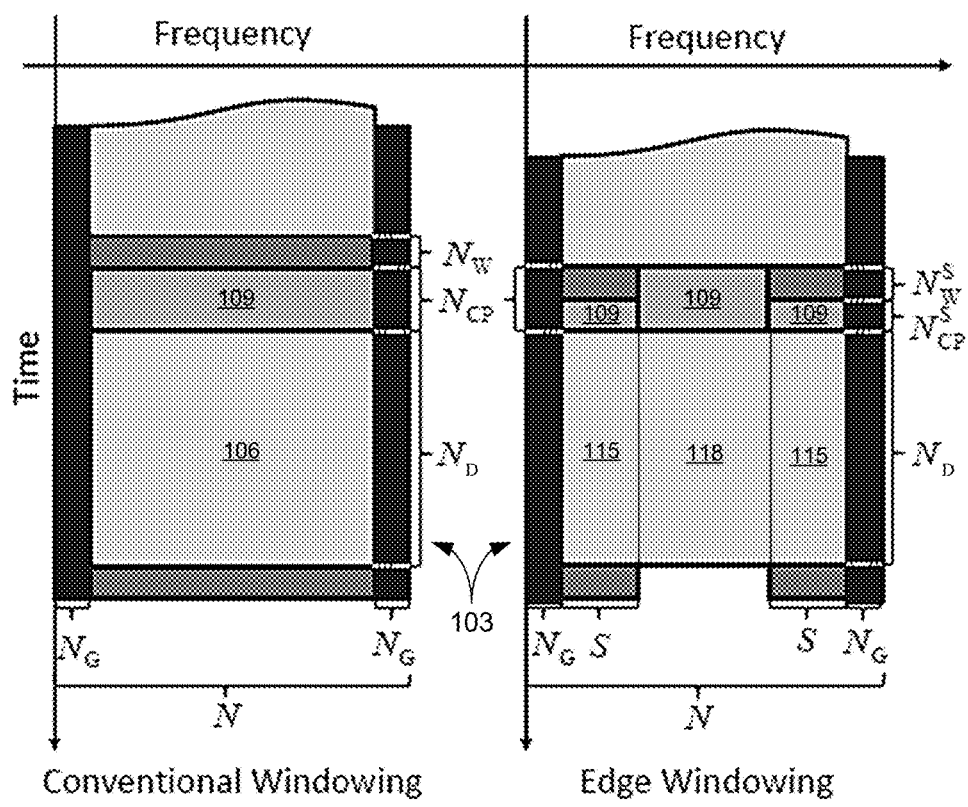
FIG. 6 includes graphical representations illustrating edge windowing of OFDM symbols in accordance with various embodiments of the present disclosure.

As discussed above, edge windowing for spectral shaping is based on combining the windowing time with the cyclic prefix. In this way, no additional windowing time is needed in the windowed carriers. Compared to conventional windowing, where all the subcarriers are windowed as shown in FIG. 1A, in the edge windowing only S edge subcarriers 115 are utilized for windowing instead of using all subcarriers as illustrated in FIG. 1B. FIG. 6 illustrates this relationship from a top down perspective. While the size of the cyclic extensions of the non-windowed subcarriers remains as $N_{CP}$, the size of the cyclic extensions of the windowed subcarriers is reduced to $N^S_{CP}$. Then, the windowing is applied to the remaining part from the cyclic extensions of windowed subcarriers as $N^S_W = N_{CP} - N^S_{CP}$ instead of using an additional windowing time $N_W$. Therefore, edge windowing eliminates the additional windowing time requirement of the conventional windowing.

For windowing, consider a raised cosine windowing function with the characteristics (in samples)

$$g_n = \begin{cases} \frac{1}{2} + \frac{1}{2}\cos\left(\pi + \frac{\pi n}{\beta_W N_T}\right) & 0 \leq n \leq \beta_W N_T \\ 1 & \beta_W N_T \leq n \leq N_T \\ \frac{1}{2} + \frac{1}{2}\cos\left(\pi - \frac{\pi n}{\beta_W N_T}\right) & N_T \leq n \leq (\beta_W+1)N_T \end{cases} \quad \text{EQN (1)}$$

where $\beta_W$ is the roll off factor ($0 \leq \beta_W \leq 1$) and $N_T$ is the symbol length for the raised cosine function. Thus, while the parameters of raised cosine windowing function are $N_T = N + N^S_{CP}$, $N^S_W = \beta^S_W(N+N^S_{CP})$ for edge windowing, the same parameters are $N_T = N + N_{CP}$, $N_W = \beta_W(N+N_{CP})$ for the conventional windowing. Note that $\beta_W \leq \beta^S_W$ when $N_W \leq N^S_W$. Thus, edge windowing can introduce better side lobe suppression performance than conventional windowing depending on the parameter of S.

Assuming that the power delay profile of the channel between the base station and the mobile stations decays exponentially, the model of the exponential decaying may be given as:

$$P_{exp}[k] = Be^{-k\alpha}, \alpha \equiv \frac{T_s}{N\tau_0} \quad \text{EQN (2)}$$

where k is the index for the tap, B and $T_0$ are the constants to be obtained to adjust the average power of channel. The summation of P[k] is set equal to 1. Hence, B is derived as:

$$\sum_{k=0}^{\infty} P[k] = 1 \rightarrow B = 1 - e^{-\alpha}. \quad \text{EQN (3)}$$

Since RMS delay spread ($T_{RMS}$ or $T_{rms}$) of the channel can be obtained from the second order central moment of EQN. (2), by calculating its inverse function, may be derived as:

$$\tau_0 = \frac{T_{rms}\beta}{2\ln\left(\frac{\beta}{2} + 1\sqrt{1+\left(\frac{\beta}{2}\right)^2}\right)}, \beta \equiv \frac{T_s}{NT_{rms}}. \quad \text{EQN (4)}$$

Also, consider that $T_{RMS}$ depends on the distance between base station and mobile station. The mathematical expression which relates $T_{RMS}$ and the distance can be given as:

$$T_{rms} = T_1 d^\epsilon y \quad \text{EQN (5)}$$

where d is the distance between base station and mobile station in kilometers, $\epsilon$ is a distance coefficient lies between $0.5 \leq \epsilon \leq 1$, $T_1$ is the median value of $T_{RMS}$ at d=1 km, and y is a log normal distributed random variable. The standard deviation of y lies as $2 \leq \sigma_y \leq 6$ in dB. Thus, the distribution of $T_{RMS}$ is also log normal.

According to EQN. (5), the mobile stations nearby the base station have less dispersive channels than the mobile stations located at farther distances. Therefore, the cyclic prefix size needed for the nearby mobile station is less than the one needed for the far mobile station. Edge windowing can exploit this feature with a frequency dependent scheduling capability of the OFDMA signals. For edge windowing, one scheduling approach is to group mobile stations with similar dispersion characteristics and to assign the group to the proper subcarriers which do not generate ISI. Three fundamental scheduling strategies may be employed for the edge windowing: random scheduling, ranging based scheduling and, $T_{RMS}$ based scheduling. The scheduling may be implemented by a scheduler 321 included in the device 300 of FIG. 3. The device 300 can include processing circuitry capable of implementing the scheduler 321.

Figure 7A:
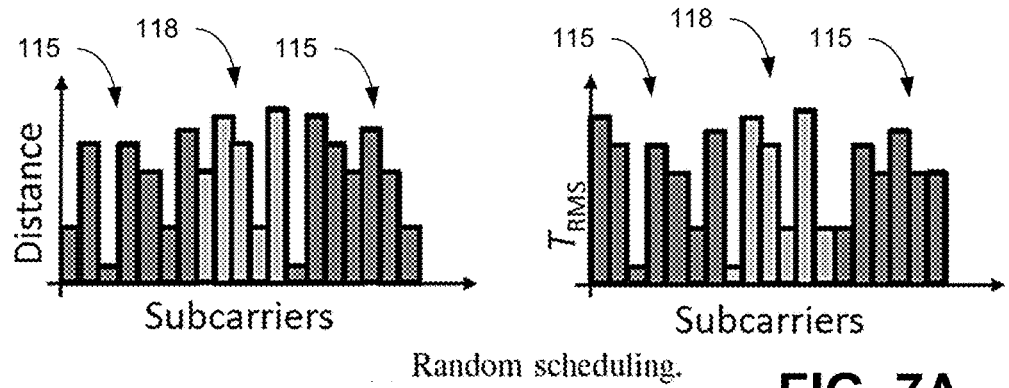
FIGS. 7A through 7C illustrate scheduling of subcarriers of an OFDM symbol in accordance with various embodiments of the present disclosure.

FIG. 7 illustrates the different scheduling strategies. Beginning with FIG. 7A, shown is a random scheduling of the subcarriers where the dispersion characteristics and the distance from the base station are not considered. Random scheduling strategy was considered to observe the impact of ignoring scheduling requirements of the edge windowing. In this scheduling strategy, all the spectrum resources are distributed randomly to the mobile stations as in FIG. 7A. Thus, the channel dispersion characteristics and the distance between mobile stations and base station were not considered for scheduling decision. However, ISI and/or ICI may be reduced by assigning mobile stations to the edge subcarriers 115 based upon distance and/or $T_{RMS}$.

Figure 7B:
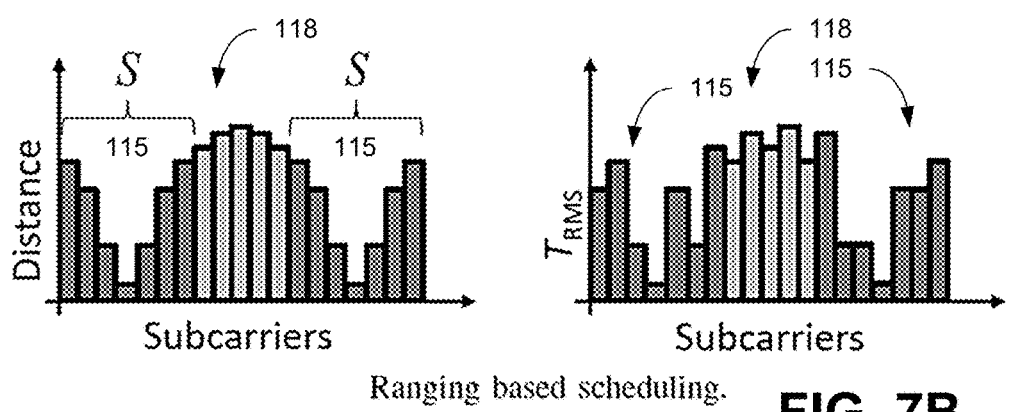

FIG. 7B illustrates scheduling of the subcarriers using estimated distance (or range) to the mobile station. The nearest mobile stations are located in the center of the edge subcarriers 115 and the mobile stations farthest away are located in the center of the inner subcarriers 118. Such a grouping does not guarantee grouping mobile stations with low $T_{RMS}$. Ranging based scheduling exploits the relation between the distance and dispersion level given in EQN. (5). Thus, it is performed after estimating the distances of the mobile stations relative to the base stations with ranging operations. In the ranging based scheduling approach, the nearby mobile stations are assigned to the windowed edge subcarriers 115, and the far away mobile stations are assigned to non-windowed inner subcarriers 118 as shown in FIG. 7B. While the spectrum resources located at the center of the band of the windowed edge subcarriers 115 are employed for the nearest mobile station, the spectrum resources located at the center of OFDM band (and thus the center of the inner subcarriers 118) are used for the farthest mobile station.

It should be noted that ranging based scheduling does not guarantee a grouping of the mobile stations with low $T_{RMS}$. Therefore, the mobile stations scheduled to subcarriers at the edges of the windowed subcarriers (e.g., mobile stations located at middle distances) can observe severe ISI because of the having probability of high $T_{RMS}$. Also, since the mobile stations are distributed uniformly in the cell area, the distribution of the distance between the mobile stations and base station is obtained as $$f_r(r) = \frac{2r}{R^2}, 0 \le r \le R. \qquad \text{EQN (6)}$$

Thus, the expected number of the mobile stations at farther distances is higher than the number of the closer ones. Therefore, increasing S also increases the probability of having ISI on these subcarriers.

Figure 7C:
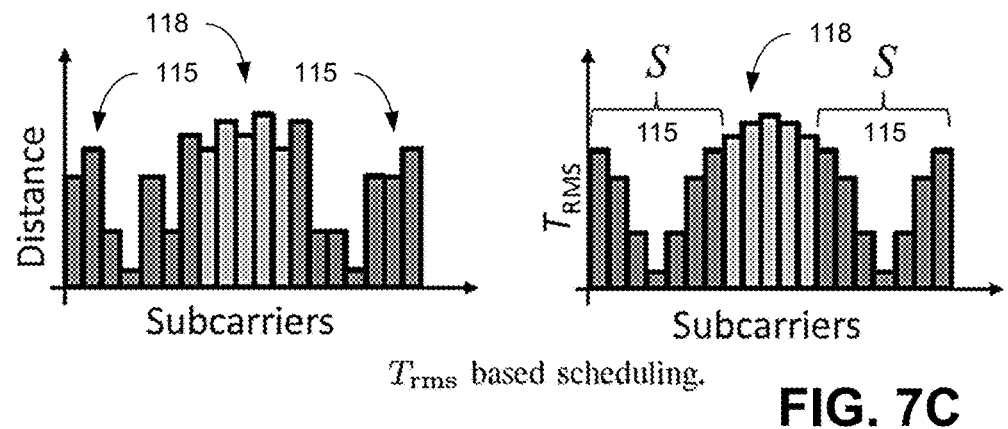

$T_{RMS}$ based scheduling applies a scheduling approach that considers the $T_{RMS}$ parameters of each of the mobile stations' channels instead of their distances to the base station. FIG. 7C illustrates scheduling of the subcarriers using $T_{RMS}$ of the mobile station. Similar to distance, mobile stations with the lowest $T_{RMS}$ are located in the center of the edge subcarriers 115 and the mobile stations with the highest $T_{RMS}$ are located in the center of the inner subcarriers 118. As shown in FIG. 7C, the mobile stations with low $T_{RMS}$ values and mobile stations with high $T_{RMS}$ values are scheduled to the windowed edge subcarriers 115 and non-windowed inner subcarriers 118, respectively. While the spectrum resources located at the center of the band of the windowed edge subcarriers 115 are utilized for the mobile station with the lowest $T_{RMS}$, the spectrum resources located at the center of the OFDM band (and thus the center of the inner subcarriers 118) are assigned for the mobile station with the highest $T_{RMS}$. As can be seen, such a grouping does not guarantee grouping the nearest mobile stations.

For $T_{RMS}$ based scheduling, the base station uses the channel dispersion information of each mobile station. In most of the wireless communication cases (e.g., Wi-Fi, LTE, etc.), the base station has ability to extract the downlink channels of the mobile stations. Thus, it is reasonable to have $T_{RMS}$ information of each mobile station at the base station. Also, it should be noted that $T_{RMS}$ is a random variable depending on the distance between mobile station and the base station as in EQN. (5). Thus, $T_{RMS}$ scheduling approach does not guarantee that the mobile stations are ordered on the spectral resources considering their distances as shown in FIG. 7C. In some implementations, a combination of distance and $T_{RMS}$ may be used for grouping subcarriers.

The performance of edge windowing along with aforementioned scheduling strategies was investigated through computer simulations. Consider that N=1024, $N_{CP}$=128, $T_S$=66.7 μs, $N_G$=80 for OFDMA symbol parameters and $T_1$=1 μs, ϵ=0.5, and $σ_y$=2 dB for the channel parameters for an urban environment. Therefore, edge windowing parameters become $0 \le N_S^{CP} \le 128$ and $0 \le S \le 432$ from this set of simulation parameters. The simulations also considered 12 subcarriers (one resource block) per mobile station and 72 mobile stations which are distributed uniformly in a cell radius of R=1000 m. All results were obtained over 50 OFDMA symbols per channel and 300 different channels per mobile station. All simulations were performed with the same set of parameters in order to obtain a reasonable set of edge windowing parameters. Initially, the side lobe suppression and throughput performances of edge windowing and conventional windowing are compared. Then, the impact of scheduling on the average EVM on subcarriers and other EVM statistics is examined.

Figure 8:
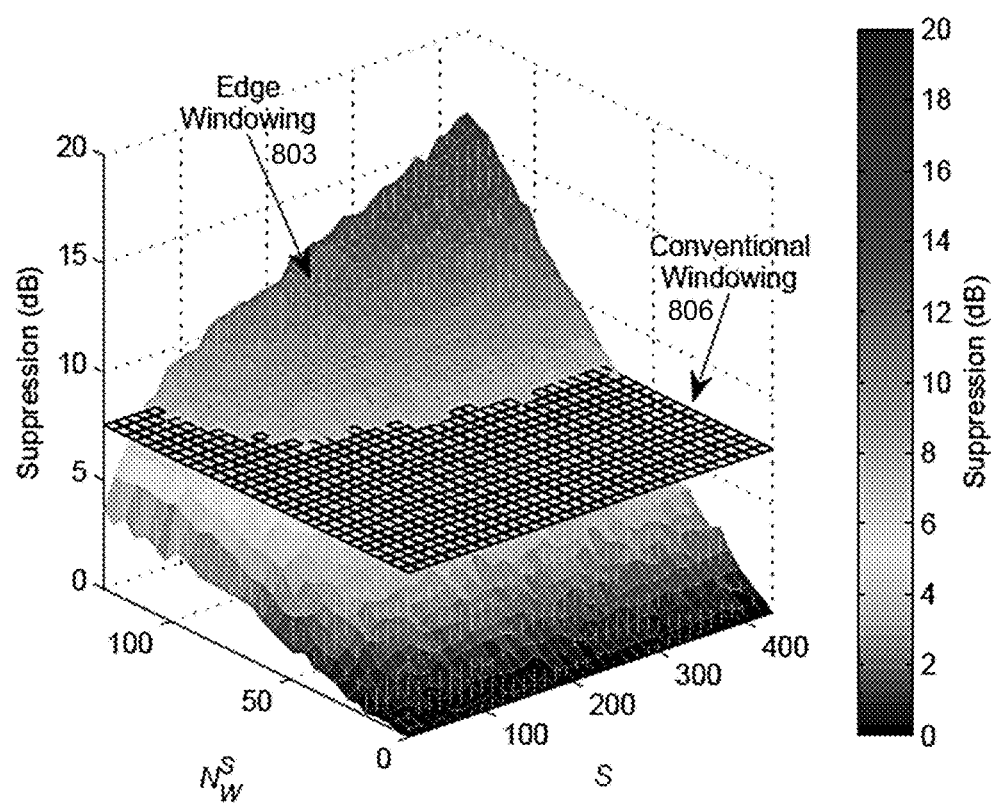
FIGS. 8, 9, 10A-10C, 11A-11C, 12A and 12B are simulation results illustrating the performance of the edge windowing with scheduling of the subcarriers in accordance with various embodiments of the present disclosure.

The side lobe suppression performance of the edge windowing depends upon the both parameters of $N^S_W$ and S. A value of $N_W$=64 was selected for conventional windowing and the side lobe suppression performances of both windowing techniques relative to the non-windowed OFDMA symbol 103 on 136.3 kHz away from the farthest edge subcarrier 115 was plotted as shown in FIG. 8. Edge windowing offers better side lobe suppression than conventional windowing depending on S when $β^S_W$ is larger than the $β_W$ (i.e. $N^S_W \ge N_W$). Since the windowing is applied to only S edge subcarriers 115, increasing S helps to improve the side lobe suppression performance of edge windowing. In FIG. 8, edge windowing performance 803 approaches to the side lobe suppression performance of the conventional windowing 806 with parameters of $N^S_W$=64 and S=192.

Edge windowing eliminates the need of additional windowing time. Thus, the throughput of the system with edge windowing is higher than the system with the conventional windowing. The increment on the throughput (ΔR) can be calculated in percent as:

$$\Delta R = 100 \frac{N_W}{N + N_{CP}}. \qquad \text{EQN (7)}$$

Considering the simulation parameters, edge windowing provided a 5.6% increment on throughput relative to the system with conventional windowing.

Figure 9:
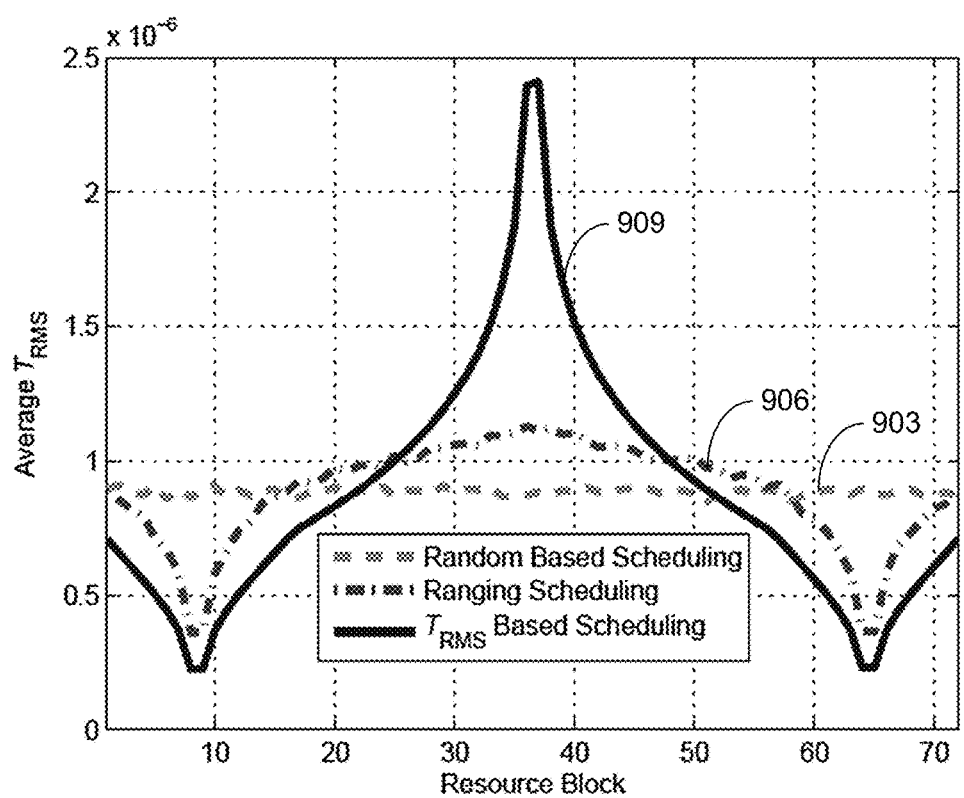

Referring now to FIG. 9, shown are the average $T_{RMS}$ values of the channels on each resource block ($N^S_W$=64 and S=192). Since random scheduling 903 does not consider the channel dispersion characteristics and the distances, average $T_{RMS}$ does not vary over the resource blocks. For ranging based scheduling 906, average $T_{RMS}$ decreases on the resource blocks where the windowing is applied and it increases at the middle of the OFDMA band. Since $T_{RMS}$ based scheduling 909 exploits the knowledge of $T_{RMS}$ of each mobile station's channel, it provides a better grouping of the mobile station with the same $T_{RMS}$. Thus, the average $T_{RMS}$ values with $T_{RMS}$ based scheduling 909 are less than the ones with ranging based scheduling 906 at the center of the band of the windowed edge subcarriers 115. $T_{RMS}$ based scheduling 909 also provides larger average $T_{RMS}$ values at the middle of the OFDM band.

In order to investigate the impact of the scheduling, the average EVM on each subcarriers and average EVM at different distances for different S values ($N^S_W$=64) were simulated and plotted in FIGS. 10A-10C and 11A-11C, respectively.

Figure 10A:
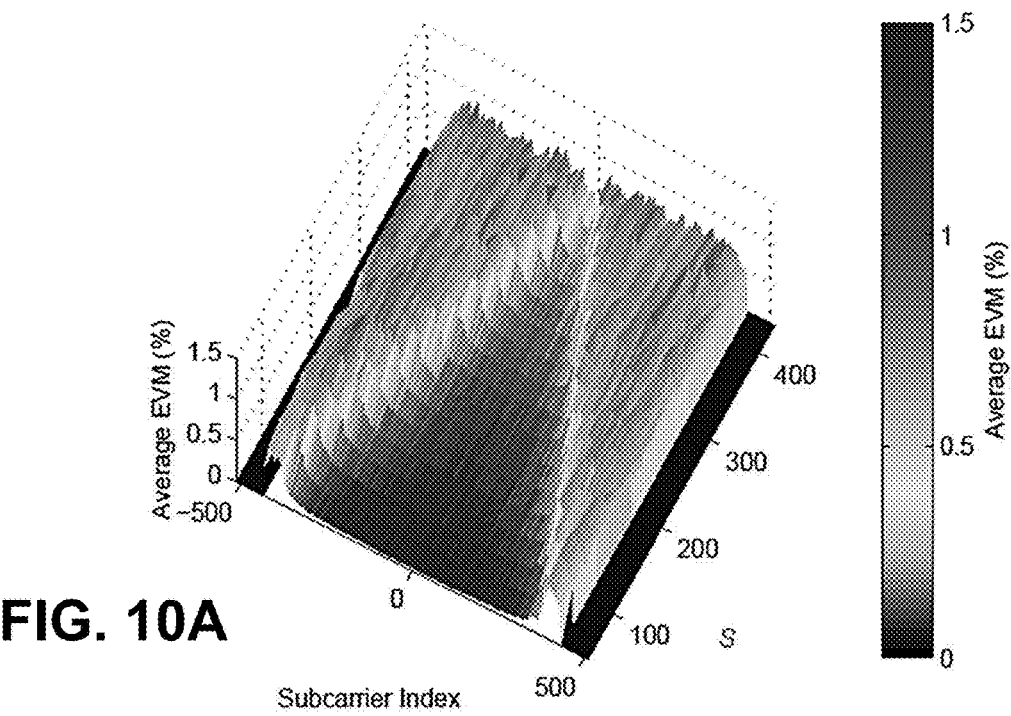
Figure 11A:
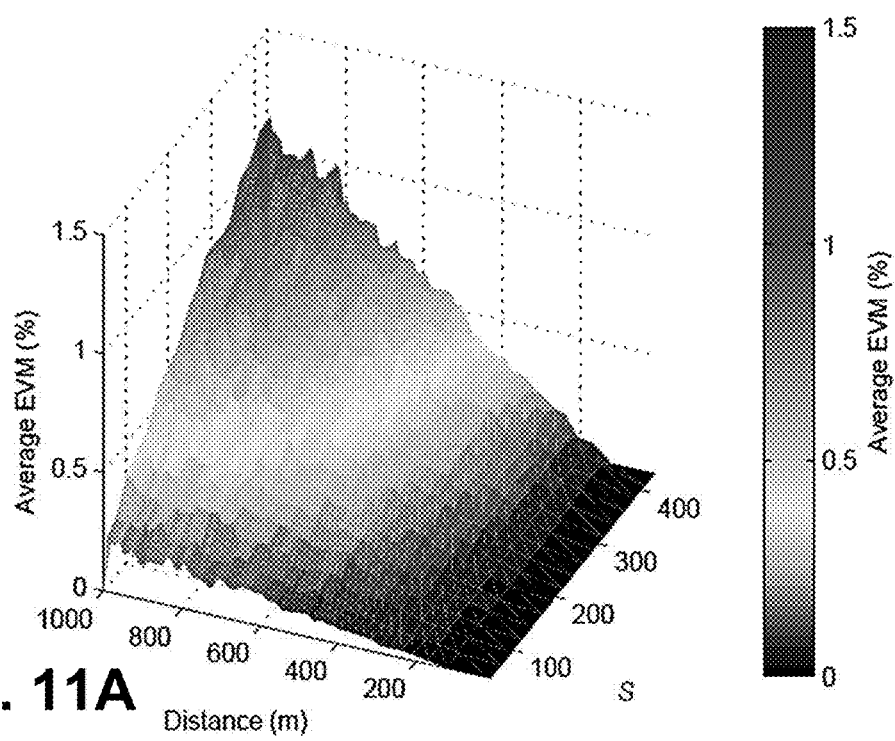

If the scheduling is performed randomly, the average EVM on the windowed subcarriers become drastically high compared to the non-windowed subcarriers as shown in FIG. 10A. Since the cyclic extension size of the windowed edge subcarriers 115 are insufficient for the mobile stations which have high dispersive channels, ISI reduces the EVM performances of these subcarriers significantly. It may especially impact the mobile stations located at farther distances. As shown in FIG. 11A, the mobile stations located at the edge of the cell observe high average EVM of 1.2%. It indicates that the average EVM increases rapidly when the distance between the mobile station and base station is increasing. Also, it shows the dependency of average EVM to the S parameter of edge windowing.

Figure 10B:
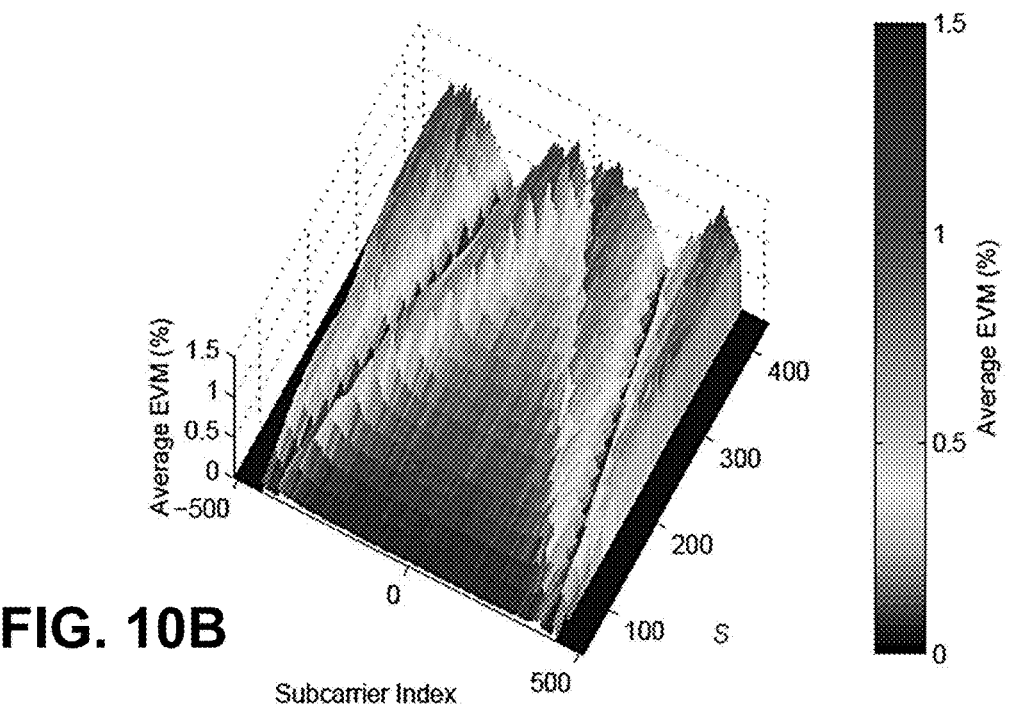
Figure 11B:
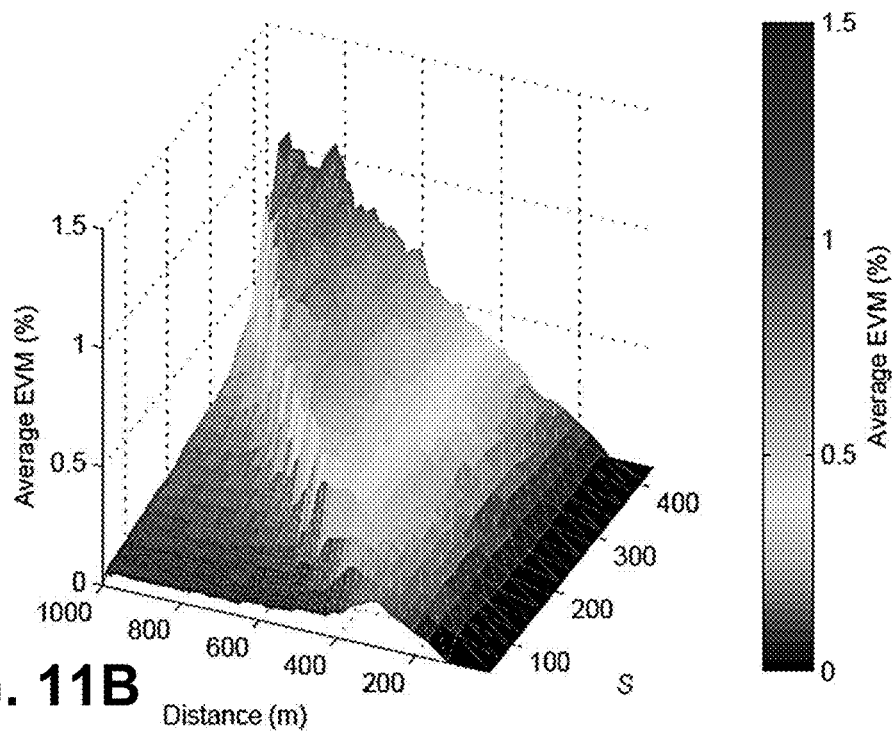

If the scheduling is performed considering the distance between the mobile stations and the base station, the average EVM raises on the subcarriers along the sides (or edges) of the windowed edge subcarriers 115 as shown in FIG. 10B. It is clear that the nearby mobile stations which are assigned to the center subcarriers of the windowed edge subcarriers 115 do not observe ISI since their channels are expected to be less dispersive. However, the mobile stations which are scheduled to the subcarriers along the sides of the windowed edge subcarriers 115 can observe severe ISI due to their distances. EQN. (6) shows that the average number of the mobile stations increases linearly with the distance. Since more mobile stations are located at the large distances, more mobile station have the channels with high $T_{RMS}$ as shown in FIG. 9. Therefore, the mobile stations scheduled to the subcarriers along the sides of the windowed edge subcarriers 115 can observe high EVM with ranging based scheduling. This issue is also illustrated in FIG. 11B. Since ranging based scheduling strategy assigns the subcarriers along the sides of the windowed edge subcarriers 115 to the mobile stations at middle distances, these mobile stations observe high EVM. For instance, the simulation results of FIG. 11B indicated that the mobile stations at 600 m away from the base station have higher average EVM than the other distances when S=192.

Figure 10C:
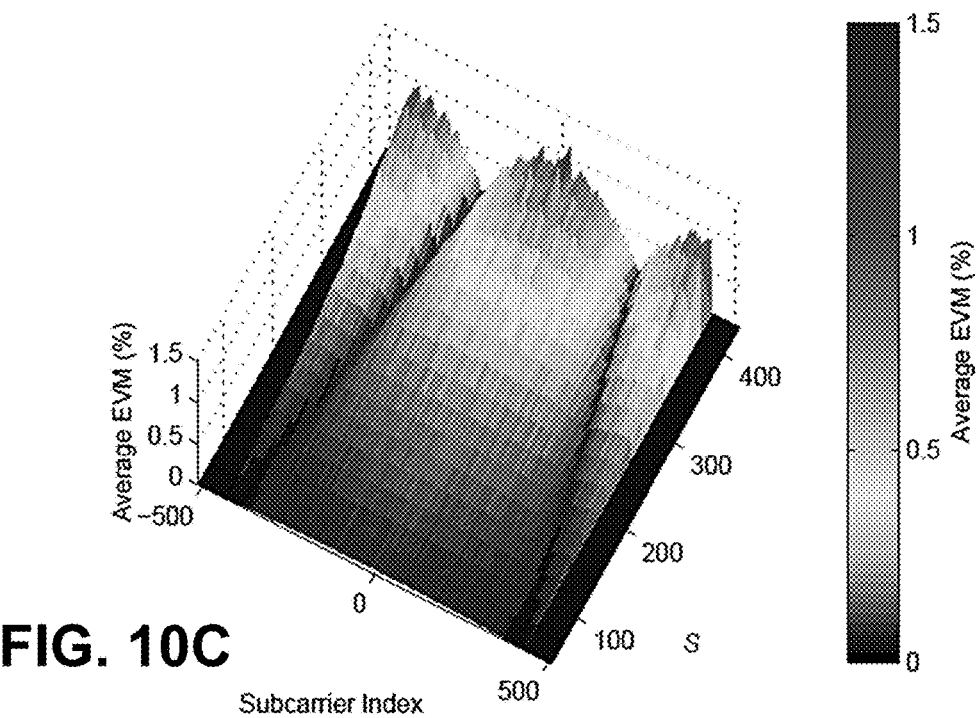
Figure 11C:
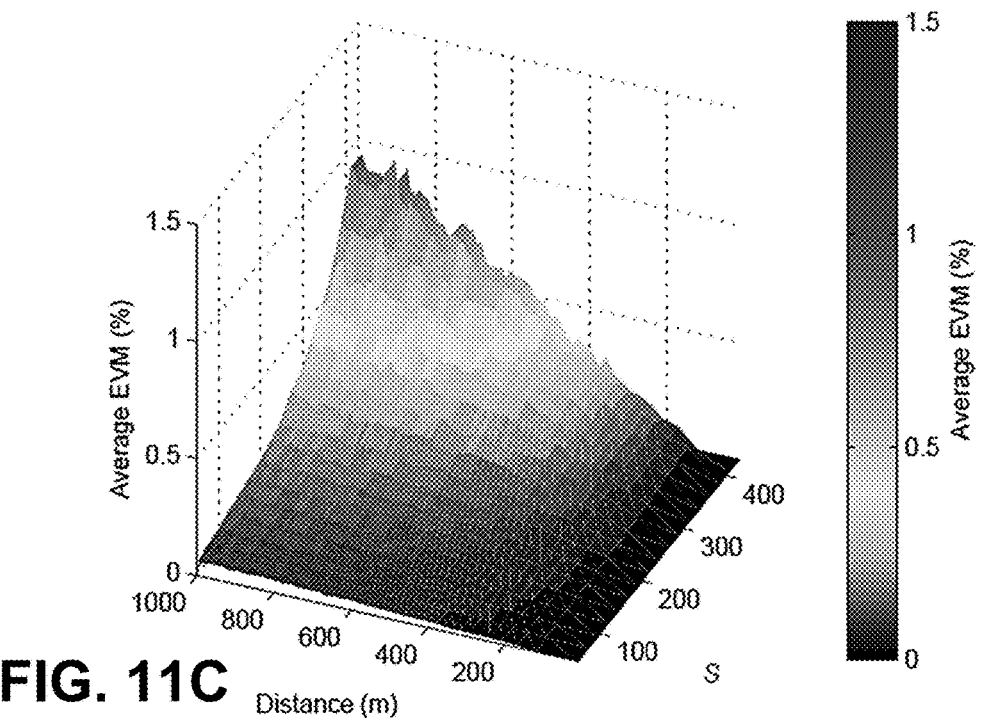

If the base station schedules the mobile stations considering the $T_{RMS}$ of each of the mobile station's channels, the average EVM performance on subcarriers increases significantly as shown in FIG. 10C. Since $T_{RMS}$ based scheduling provides better grouping of the mobile stations with the same $T_{RMS}$ than the ranging based scheduling, it offers better average EVM performance. However, using higher S values (e.g., 300) impacts the EVM on the subcarriers along the sides of the windowed edge subcarriers 115. Also, increasing S degrades the average EVM of the far mobile stations because they have highly dispersive channels. The relation between the distance of the mobile station and average EVM is given for different S values is illustrated in FIG. 11C. If S=192 is considered for the system design, average EVM does not exceed 0.25% in both FIGS. 10C and 11C.

Figure 12A:
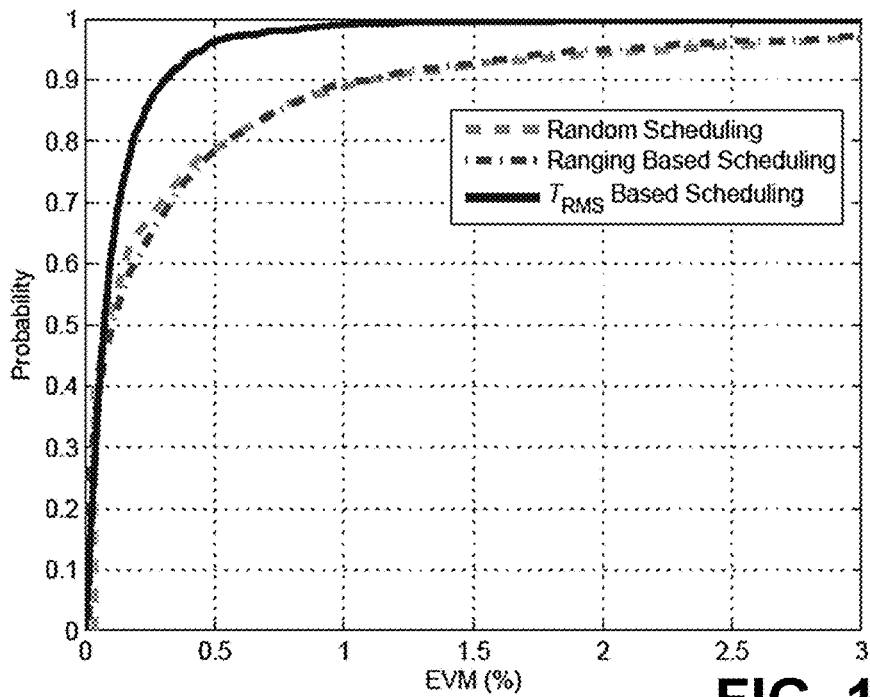
Figure 12B:
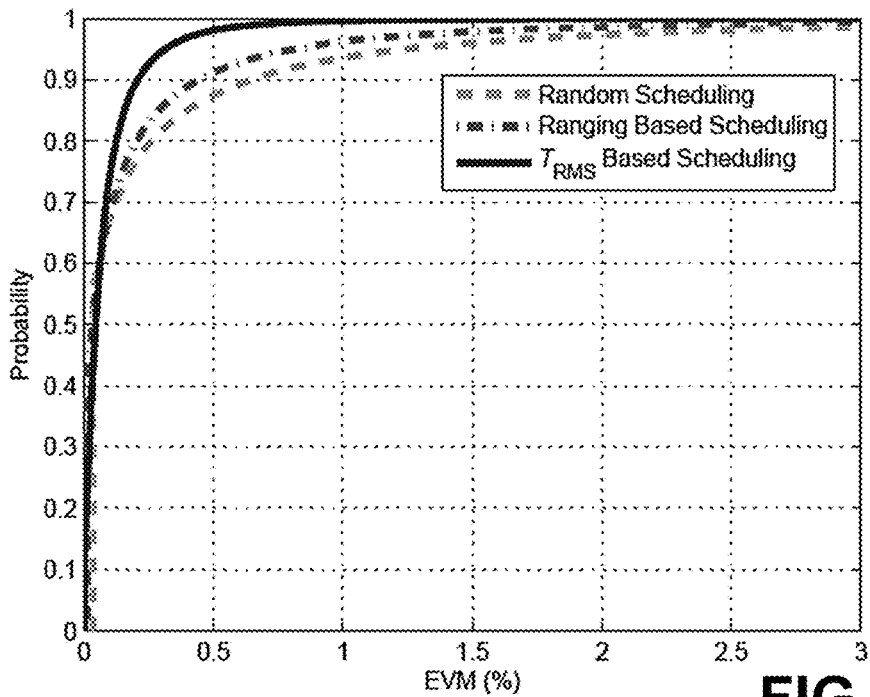

According to simulation results given in FIGS. 10A-10C and 11A-11C, the edge windowing along with $T_{RMS}$ based scheduling is superior than the other scheduling strategies when $N^S_W$=64 and S=192. For $N^S_W$=64 and S=192, the statistical distributions of EVM on the subcarriers were analyzed in FIG. 12. The lower CDF bound of EVM on subcarriers is given in FIG. 12A by considering the worst case probability for a given EVM value on each subcarrier. Thus, the CDF curve of EVM for each subcarrier is always better than the curves given in FIG. 12A. Also, the average of the all CDF curves of EVM on subcarriers is given in FIG. 12B in order to evaluate the impact of the scheduling. As shown in FIG. 12B, whereas the worst case probability of EVM below 0.5% is 79% for both random scheduling and ranging based scheduling, it is 96% for $T_{RMS}$ based scheduling. Even if the worst case probabilities are the same for both ranging based scheduling and random scheduling, the probability values are different in average case. As shown in FIG. 12B, while the probability is 91% for ranging based scheduling, it is 87% for random scheduling. Also, the probability of 98% is obtained for $T_{RMS}$ based scheduling.

The analysis indicates that edge windowing along with a proper scheduling provides both side lobe suppression and increments on the throughput with tolerable EVM on subcarriers. Ranging based scheduling provides improvement on EVM performance compared to the random scheduling, however ranging based scheduling does not guarantee grouping of the mobile stations with the same $T_{RMS}$. $T_{RMS}$ based scheduling along with the edge windowing provides an improvement on EVM performances by guarantying such a grouping. Considering the simulation parameters, the worst case probability of EVM below 0.5% on a subcarrier is 96% with $T_{RMS}$ based scheduling when $N^S_W$=64, S=192. Also, edge windowing provided a 5.6% increment on throughput compared to the conventional windowing.

Figure 13A:
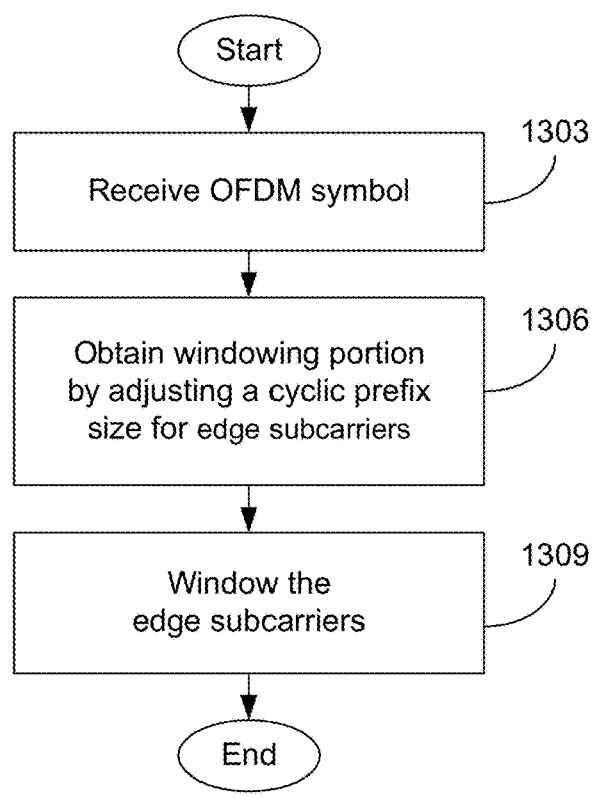
FIG. 13A is a flow chart providing an example of edge windowing of OFDM symbols in accordance with various embodiments of the present disclosure.

Referring next to FIG. 13A, shown is a flow chart illustrating an example of edge windowing of OFDM symbols 103. Beginning with 1303, one or more OFDM symbols 103 are received. The OFDM symbols 103 can include a cyclic prefix and a data portion. The subcarriers of the OFDM symbol 103 may have been scheduled to reduce ISI and ICI as discussed above. The subcarriers may be scheduled based at least in part upon the $T_{RMS}$ and/or the distance of corresponding user devices. In 1306, the cyclic prefix can be adjusted for a predefined quantity of edge subcarriers 115. For example, the cyclic prefix size ($N_{CP}$) may be reduced for a plurality of edge subcarriers 115 in the OFDM symbol to obtain an edge windowing portion ($N^{edge}w$) within the cyclic prefix the OFDM symbol 103. A windowing function may then be applied to the edge subcarriers 115 in 1309 to reduce side lobes. In some implementations, an inner windowing portion ($N^{inner}_W$) may be obtained within the cyclic prefix and a second windowing function may be applied to the inner subcarriers 118 of the OFDM symbol 103. The transition of the windowing function(s) occurs within the windowing portion(s) of the cyclic prefix. The process may be repeated for each of a series of OFDM symbols. The processed OFDM symbol may then be provided for transmission.

Figure 13B:
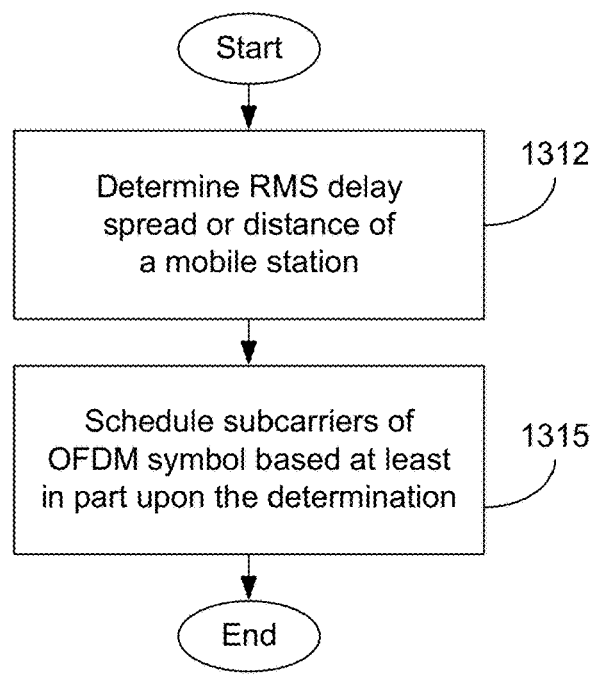
FIG. 13B is a flow chart providing an example of scheduling subcarriers of OFDM symbols in accordance with various embodiments of the present disclosure.

Referring next to FIG. 13B, shown is a flow chart illustrating an example of scheduling subcarriers of OFDM symbols 103. Beginning with 1312, a RMS delay spread associated with one or more mobile stations (or user devices) and/or a distance between the one or more mobile stations and a base station is determined. In 1315, subcarriers of the OFDM symbols are scheduled to the one or more mobile stations based upon the determination. For example, scheduling of the subcarriers may be based at least in part upon the RMS delay spread and/or the distance.

Figure 14:
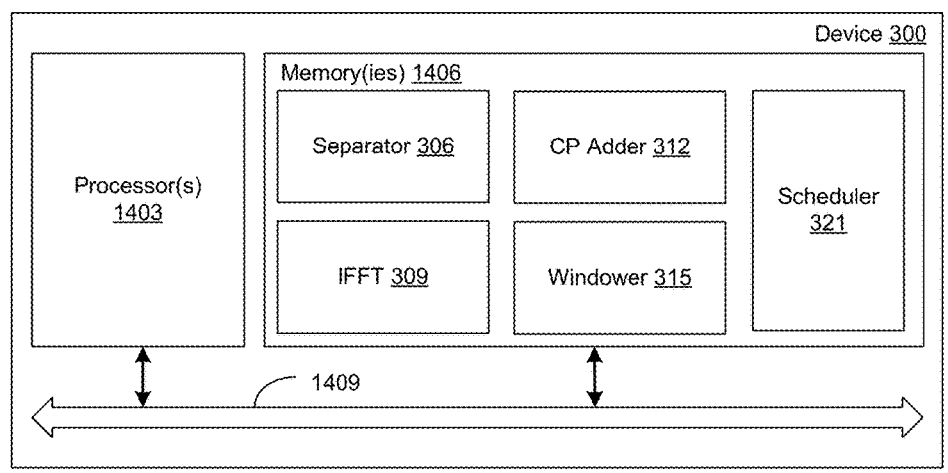
FIG. 14 is a schematic block diagram illustrating an example of the device of FIG. 3 in accordance with various embodiments of the present disclosure.

With reference to FIG. 14, shown is a schematic block diagram of an example of the device 300 of FIG. 3 in accordance with various embodiments of the present disclosure. The device 300 includes at least one processor circuit, for example, having a processor 1403 and a memory 1406, both of which are coupled to a local interface 1409. The device 300 may include one or more interface(s) that comprise processing circuitry for supporting W-Fi communications such as, e.g., IEEE 802.11 a/b/g/n or other wireless communication protocols, and/or cellular communications such as, e.g., LTE, WiMAX, WCDMA, HSDPA, or other wireless communication protocols that utilize OFDM. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. The local interface 1409 may comprise, for example, a data bus with an accompanying address/control bus or other bus structure as can be appreciated.

Stored in the memory 1406 may be both data and several components that are executable by the processor 1403. In particular, stored in the memory 1406 and executable by the processor 1403 may be a separator 306, an IFFT 309, a CP adder 312, a windower 315, a scheduler 321, and potentially other applications and device interfaces. In addition, an operating system may be stored in the memory 1406 and executable by the processor 1403. In some cases, the processor 1403 and memory 1406 may be integrated as a system-on-a-chip. In other embodiments, the separator 306, IFFT 309, CP adder 312, windower 315, and/or scheduler 321 may be implemented in firmware or dedicated hardware.

It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the separator 306, IFFT 309, CP adder 312, windower 315, scheduler 321, and other various systems described herein may be embodied in software or code executed by general purpose hardware, as an alternative the same may also be embodied in dedicated hardware, firmware, or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 13A and 13B show the functionality and operation of an implementation of portions of the separator 306, IFFT 309, CP adder 312, windower 315, and/or scheduler 321. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1403 in a computer system or other system. The machine code may be converted from the source code, etc. If embodied in hardware, each block may represent a circuit or a number of interconnected circuits to implement the specified logical function(s).

Although the flowcharts of FIGS. 13A and 13B show a specific order of execution, it is understood that the order of execution may differ from that which is depicted. For example, the order of execution of two or more blocks may be scrambled relative to the order shown. Also, two or more blocks shown in succession in FIGS. 13A and 13B may be executed concurrently or with partial concurrence. Further, in some embodiments, one or more of the blocks shown in FIGS. 13A and 13B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the separator 306, IFFT 309, CP adder 312, windower 315, and/or scheduler 321 that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for edge windowing of orthogonal frequency division multiplexing symbols, the method comprising:
   receiving, by processing circuitry, an orthogonal frequency division multiplexing symbol including a cyclic prefix and a data portion, the orthogonal frequency division multiplexing symbol comprising a plurality of adjacent inner subcarriers located in a middle portion of the orthogonal frequency division multiplexing symbol between a plurality of edge subcarriers;
   obtaining, by the processing circuitry, an edge windowing portion in the cyclic prefix by reducing a cyclic prefix size associated with a predefined quantity of the plurality of edge subcarriers in the orthogonal frequency division multiplexing symbol without affecting a cyclic prefix size associated with the plurality of adjacent inner subcarriers; and
   reducing, by the processing circuitry, side lobes of the orthogonal frequency division multiplexing symbol by applying a first windowing function to the edge windowing portion of the predefined quantity of the plurality of edge subcarriers associated with the reduced cyclic prefix size to produce windowed edge subcarriers.

2. The method of claim 1, wherein a transition of the first windowing function occurs within the edge windowing portion.

3. The method of claim 1, further comprising obtaining an inner windowing portion by reducing a cyclic prefix size associated with a predefined quantity of the plurality of adjacent inner subcarriers.

4. The method of claim 3, further comprising applying a second windowing function to the inner windowing portion of the predefined quantity of the plurality of inner subcarriers associated with the reduced cyclic prefix size to produce windowed inner subcarriers.

5. The method of claim 4, further comprising combining the windowed edge subcarriers and the windowed inner subcarriers to reform the OFDM symbol for transmission.

6. The method of claim 3, wherein a length of the edge windowing portion is longer than that of the inner windowing portion.

7. A device, comprising:
   a separator that divides subcarriers of an orthogonal frequency division multiplexing symbol into a first subcarrier group comprising edge subcarriers of the orthogonal frequency division multiplexing symbol and a second subcarrier group comprising inner subcarriers of the orthogonal frequency division multiplexing symbol, where the second subcarrier group comprises a plurality of adjacent inner subcarriers located between two subgroups of adjacent edge subcarriers of the first subcarrier group and a first cyclic prefix (CP) size associated with the plurality of adjacent inner subcarriers;

a first CP adder that provides an edge windowing portion within a cyclic prefix of the orthogonal frequency division multiplexing symbol by adjusting a second cyclic prefix size associated with the first subcarrier group; and a first windower that reduces side lobes of the orthogonal frequency division multiplexing symbol by applying a first windowing function to the edge windowing portion.

8. The device of claim 7, further comprising:

a second CP adder that provides an inner windowing portion within the cyclic prefix by adjusting the first cyclic prefix size associated with the second subcarrier group; and a second windower that applies a second windowing function to the inner windowing portion.

9. The device of claim 8, wherein a transition of the first windowing function and the second windowing function occur within the edge windowing portion and the inner windowing portion, respectively.

10. The device of claim 8, wherein a length of the edge windowing portion is longer than that of the inner windowing portion.

11. The device of claim 8, further comprising a combiner that sums the windowed edge subcarriers and the windowed inner subcarriers to reform the OFDM symbol for transmission.

12. A device, comprising:

means for dividing subcarriers of an orthogonal frequency division multiplexing symbol into a first subcarrier group comprising edge subcarriers of the orthogonal frequency division multiplexing symbol and a second subcarrier group comprising inner subcarriers of the orthogonal frequency division multiplexing symbol, where the second subcarrier group comprises a plurality of adjacent inner subcarriers located between two subgroups of adjacent edge subcarriers of the first subcarrier group and a first cyclic prefix (CP) size associated with the plurality of adjacent inner subcarriers;

means for providing an edge windowing portion within a cyclic prefix of the orthogonal frequency division multiplexing symbol by adjusting a second cyclic prefix size associated with the first subcarrier group; and means for reducing side lobes of the orthogonal frequency division multiplexing symbol by applying a first windowing function to the edge windowing portion.

13. The device of claim 12, further comprising:

means for providing an inner windowing portion within the cyclic prefix by adjusting the first cyclic prefix size associated with the second subcarrier group; and means for applying a second windowing function to the inner windowing portion.

14. The device of claim 13, further comprising means for summing the windowed edge subcarriers and the windowed inner subcarriers to reform the OFDM symbol for transmission.

* * * * *